June 20, 1933. G. CHADWICK 1,914,801
MACHINE FOR MAKING REENFORCED SHEET MATERIALS
Filed April 14, 1931 4 Sheets-Sheet 1

INVENTOR.
George Chadwick
by Parker & Crocknow
ATTORNEYS.

June 20, 1933. G. CHADWICK 1,914,801
MACHINE FOR MAKING REENFORCED SHEET MATERIALS
Filed April 14, 1931 4 Sheets-Sheet 2
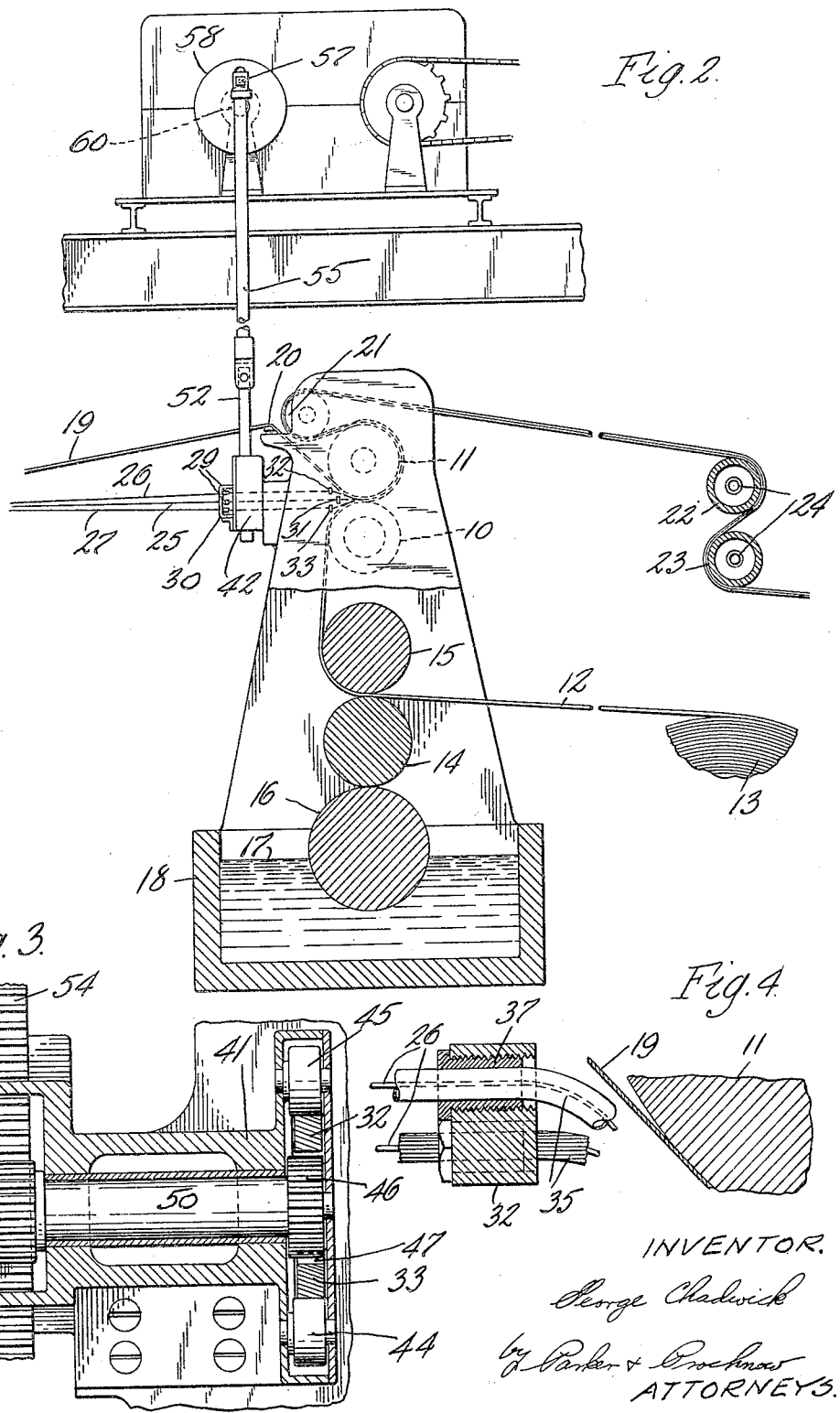

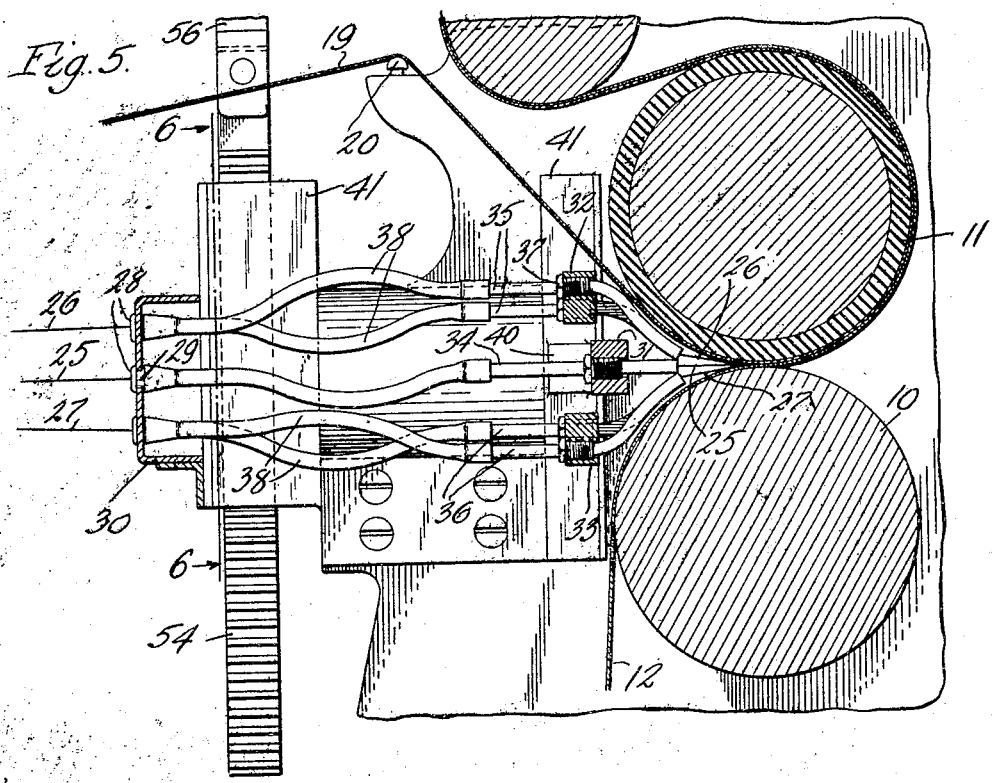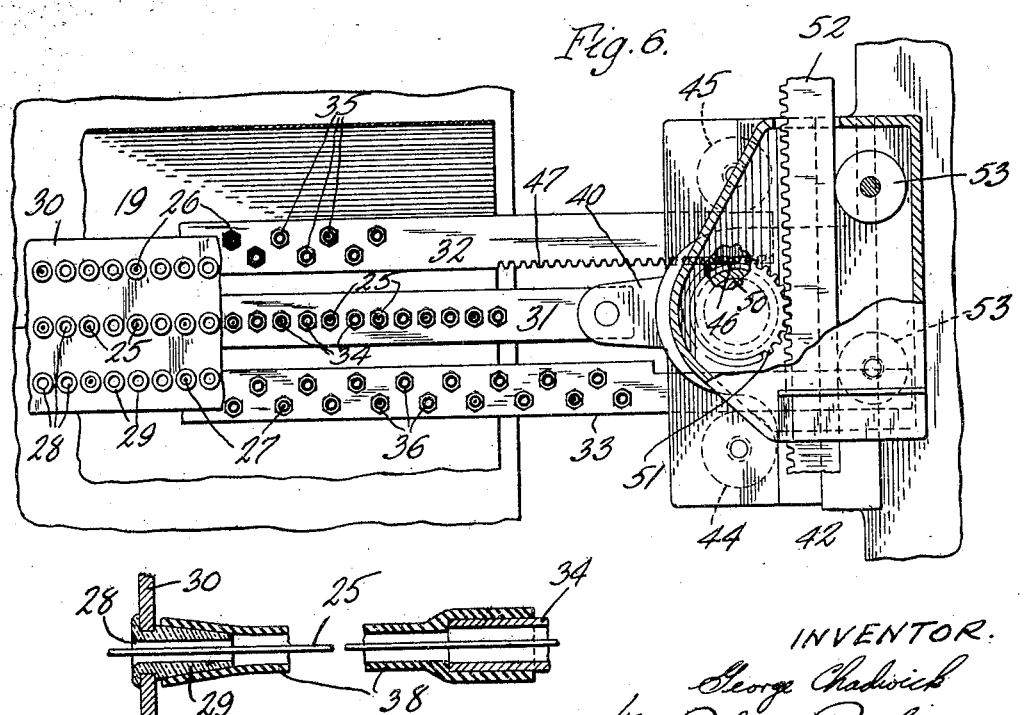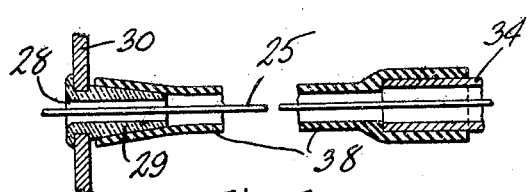

June 20, 1933.　　　G. CHADWICK　　　1,914,801
MACHINE FOR MAKING REENFORCED SHEET MATERIALS
Filed April 14, 1931　　　4 Sheets-Sheet 4

INVENTOR.
George Chadwick
by Parker & Crohnow
ATTORNEYS.

Patented June 20, 1933

1,914,801

UNITED STATES PATENT OFFICE

GEORGE CHADWICK, OF LEWISTON HEIGHTS, NEW YORK

MACHINE FOR MAKING REENFORCED SHEET MATERIALS

Application filed April 14, 1931. Serial No. 530,022.

This invention relates to improvements in machines for making reenforced sheet material such as composite paper of that sort which is strengthened or reenforced by means of threads, wires or the like of fibrous or other material (hereinafter termed "threads") usually incorporated between two plies or webs of paper which are cemented together by an interposed adhesive film.

The machine hereinafter described is adapted, for instance, for making the reenforced paper disclosed in my application for patent for reenforced paper, filed of even date herewith.

In the reenforced paper disclosd in said application, and also illustrated in Fig. 8 hereof, the thread reenforcement comprises a series of substantially straight spaced threads which run lengthwise of the web or sheet, and two series of spaced zig-zag threads, which extend lengthwise of the web or sheet in zig-zag courses with each of the zig zag threads of one series crossing or intersecting several of the zig zag threads of the other series and also several of the straight threads.

An object of my invention is to produce a practical and efficient machine by means of which reenforced paper or material of this sort can be produced rapidly and economically. Other objects of the invention are to provide guide or laying mechanism for the reenforcing threads which is constructed so as to insure that the threads will be disposed uniformly throughout all portions of the sheet material; which enables ready adjustment to differently space the reenforcing threads as desired and to increase or decrease, as desired, the transverse width of the zig-zag courses of the threads so as to produce materials in which each zig-zag thread crosses a greater or less number of other threads; in which the thread guiding or laying mechanism is constructed so as to greatly facilitate the threading of the machine and also to permit one or more threads to be quickly and easily threaded through the guiding mechanism to replace a broken thread or threads without stopping the machine; also to produce a machine of the character mentioned which is improved in the respects hereinafter described and set forth in the claims.

In the accompanying drawings:

Fig. 2 is a longitudinal fragmentary sectional elevation thereof on line 2—2, Fig. 1.

Fig. 3 is a transverse sectional elevation, enlarged, of the reciprocating mechanism for the thread guides.

Fig. 4 is a fragmentary sectional elevation, enlarged, showing one of the reciprocating thread guide bars and adjacent presser roller.

Fig. 5 is a longitudinal sectional elevation, on an enlarged scale, showing the rollers for pressing together the component webs of the material, and the associated thread guiding mechanism.

Fig. 6 is a transverse sectional elevation thereof, on an enlarged scale, on line 6—6, Fig. 5.

Fig. 7 is a detailed section of one of the thread guiding tubes.

Figure 1:
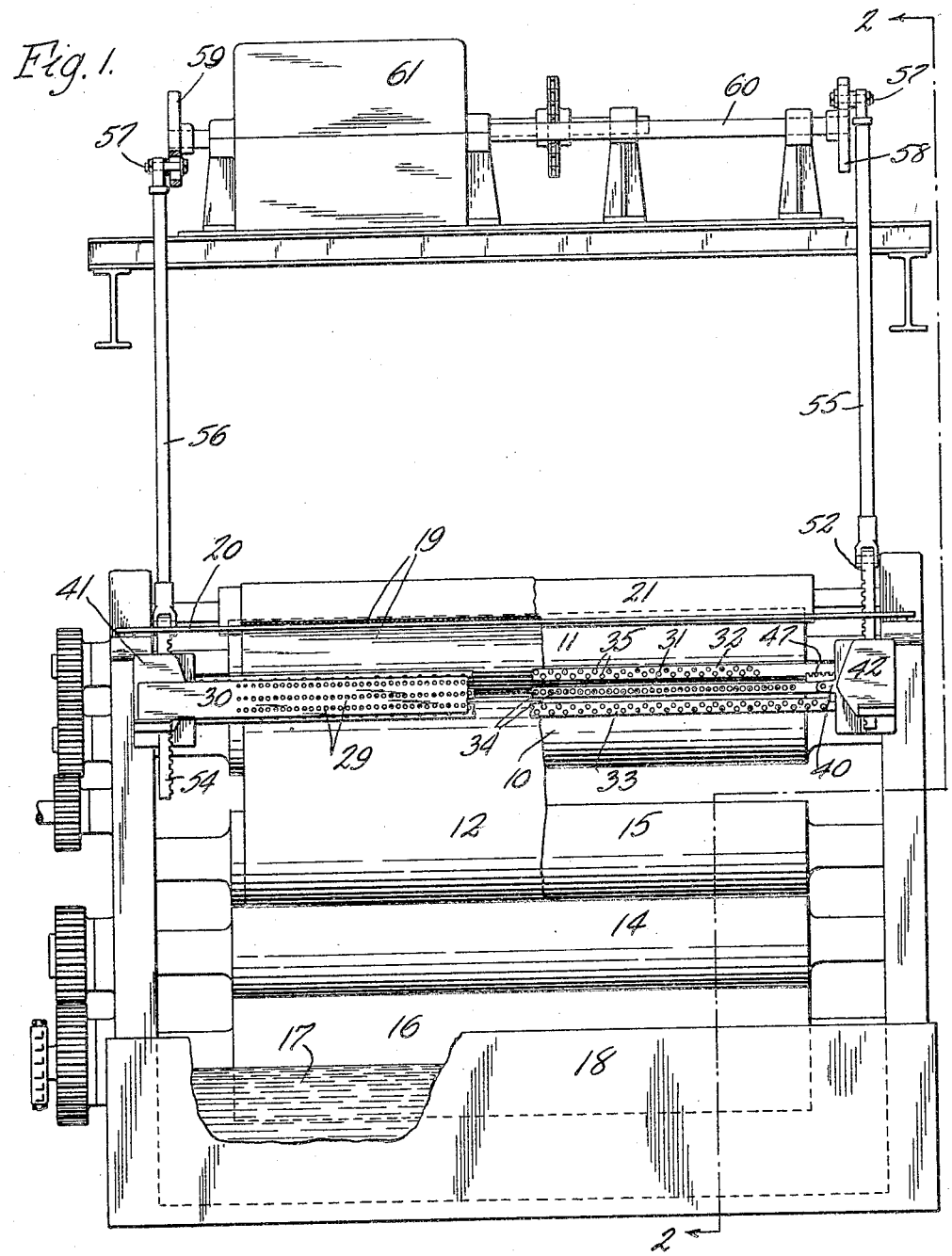
Fig. 1 is a transverse elevation, partly in section, of a machine exemplifying one embodiment of my invention.

In the machine herein disclosed to illustrate my invention as usual in machines for producing reenforced material of the sort mentioned, two continuous webs of sheet material, such as paper, are caused to travel between presser rollers, an adhesive coating is applied to the inner surface of one or both of these traveling webs before it passes between the presser rollers, and thread guiding or laying means are also provided for introducing the reenforcing threads between the two traveling webs as they enter the bite of the presser rollers so that the threads will stick to the adhesive coating and be drawn with the webs between the rollers which press the two webs together, the webs being thus cemented together and the reenforcing threads cemented in place between the webs.

Now referring to the machine illustrated in the drawings, 10 and 11 represent respectively lower and upper presser rollers which are suitably journaled in the machine one above the other. The lower web 12 of paper or material is drawn from a suitable supply roll 13, see Fig. 2, and passes between two rollers 14 and 15, suitably journaled in the machine one above the other, the web passing partly around the roller 15 and thence to the lower presser roller 10. The adhesive coating is applied to the inner surface of the lower web 12 by the roller 14, which, for this purpose, rotates in contact with another roller 16 which dips into a body of suitable liquid adhesive 17, such, for instance, as asphalt, within a receptacle or container 18. As the roller 16 rotates, it carries the liquid upon its surface and applies the same to the roller 14, spreading the liquid uniformly in a thin film on the surface of the roller 14, which, in turn, applies the liquid in a thin uniform coating on the surface of the lower web 12.

The other, or upper web, 19, of paper or material is drawn from a suitable supply roll (not shown) and passes over a guide 20 and thence between the presser rollers 10 and 11. From the presser rollers 10 and 11 the two webs 12 and 19, which are caused to adhere together by the adhesive coating, pass partially around the upper pressure roller 11 and thence around a guide roller 21 from which the composite web passes through cooling or chilling rollers 22 and 23 from which the finished material passes to a receiving roll, not shown. It will be understood that, as usual, certain of the rollers are positively driven by suitable mechanism (not shown) to cause the webs to travel through the machine in the manner mentioned and also, that the liquid adhesive is heated in the receptacle 18 or otherwise to keep it in a suitably fluid condition for application to the web 12. The chilling rollers 22 and 23 are cooled by brine or other cooling medium circulated through them, as by means of pipes 24, for the purpose of chilling or setting the adhesive coating or film between the webs 12 and 19 before the coating has an opportunity to soak into or penetrate through the webs 12 and 13. As thus far described, the machine is of ordinary construction and operation and it may be constructed as illustrated or be of any other usual or suitable construction.

Figure 8:
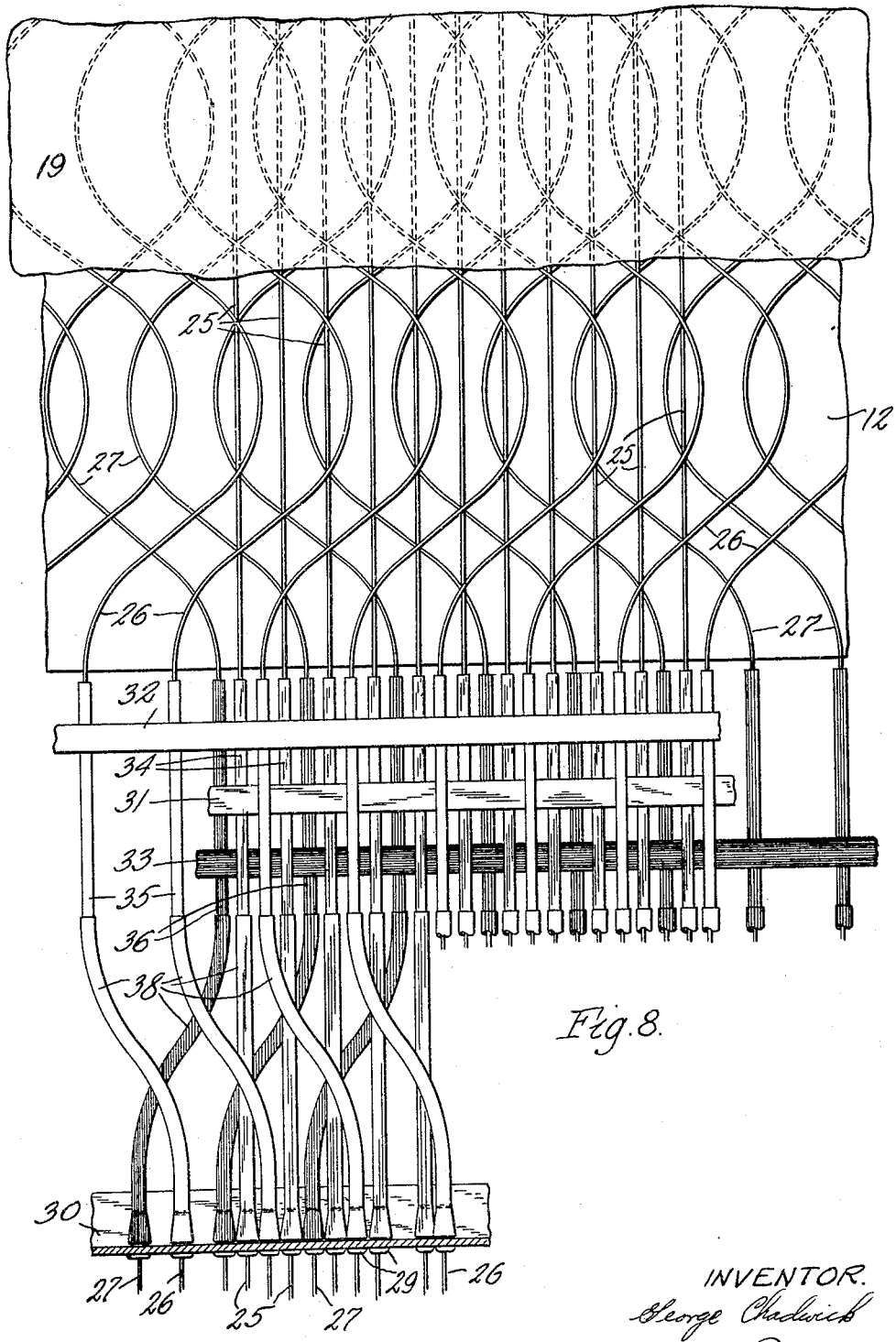
Fig. 8 is a schematic plan view showing a portion of the reenforced material and the associated thread guiding or laying mechanism.

The thread reenforcement incorporated between the two webs 12 and 19 of the material, as illustrated in Fig. 8, comprises a series of spaced substantially straight, longitudinal threads 25, an upper series of zig-zag threads 26 and a lower series of zig-zag threads 27. The upper zig-zag threads 26 extend lengthwise of the webs in zig-zag courses above the longitudinal threads 25 and the lower zig-zag threads 27 extend lengthwise in zig-zag courses below the longitudinal threads, each of the zig-zag threads of one series crossing or intersecting several of the longitudinal threads and also several of the zig-zag threads of the other series.

These three series of threads are supplied from bobbins or spools, not shown, which may be mounted on fixed spindles on a suitable frame rack and from which bobbins the threads pass through stationary guide orifices 28, preferably formed by tubes or nipples 29 (see Figs. 5 and 7) mounted in a stationary support or beam 30 extending transversely of the machine in advance of the presser rollers 10 and 11. Each of the several threads passes through one of these nipples 29 and the nipples are preferably arranged, as shown, in three horizontal rows on the beam 30, the longitudinal threads 25 passing through the nipples in the middle row, and the upper and lower zig-zag threads passing respectively through the nipples in the upper and lower horizontal rows. Arranged just in advance of the presser rollers 10 and 11 is a stationary bar 31 and upper and lower parallel reciprocating bars 32 and 33. These bars extend horizontally transversely of the machine or parallel with the axes of the presser rollers 10 and 11. The stationary middle bar 31 is provided with a series of guide tubes 34 corresponding in number with the middle row of nipples 29, and similarly each of the reciprocating bars 32 and 33 is provided with a series of guide tubes 35 and 36 corresponding in number respectively to the upper and lower rows of nipples 29. As shown, the guide tubes 34, 35 and 36 pass through holes in their respective bars 31, 32 and 33 in which they are suitably secured, preferably removably, by means of clamping sleeves or bushings 37. The inner ends of the several guide tubes 34, 35 and 36 extend into the gap between the presser rollers 10 and 11 as close as possible to the bite of the rollers and the inner ends of the lower guide tubes 36 are preferably inclined or bent upwardly, while the inner ends of the upper guide tubes 35 are inclined or bent downwardly so that the inner ends of all of the tubes are located in or close to the horizontal plane of contact of the two presser rollers 10 and 11. Each of the stationary guide nipples 29 is connected by a movable tube 38, which may be a flexible rubber tube, to one of the guide tubes 34, 35 or 36, the nipple 29, flexible tube 38 and guide tube 34, 35 or 36 to which it is connected, thus forming a continuous flexible guide tube or passage for one of the threads 25, 26 or 27.

The bars 32 and 33, which carry the upper and lower rows of guide tubes 35 and 36, are mounted and operated to reciprocate transversely of the webs 12 and 19, or parallel with the axes of the presser rollers, during the travel of the webs through the machine to thereby cause the zig-zag arrangement of the upper and lower series of threads, but since the threads 25 of the middle series extend straight, lengthwise of the webs, the middle bar 31 does not have to reciprocate but is mounted stationarily in the machine.

The bar 31 may be thus stationarily mounted in any suitable manner, for instance, by attaching it at its ends to stationary supporting brackets or parts 40 at opposite sides of the machine frame. The reciprocating bars 32 and 33 however are slidably mounted at their opposite ends in suitable supports which permit the reciprocation of these two bars. In the construction shown, the opposite ends of the upper and lower bars 32 and 33 extend into guide boxes 41 and 42 stationarily mounted on the main frame of the machine at the opposite sides thereof or outwardly beyond the opposite ends of the presser rollers 10 and 11. As shown in Figure 6, a bearing roller 44 is journaled in the lower portion of the box 42 and a bearing roller 45 is journaled in the upper portion of this box. The adjacent end of the lower bar 33 rests on, and is supported by, the lower roller 44, which thus forms roller bearing for the bar. Similarly, the adjacent end of the upper bar 32 has a roller bearing against the upper roller 45. The other box 41 is furnished with similar rollers forming roller bearings for the opposite ends of the bars 32 and 33. Journaled within the box 42 between the bearing rollers 44 and 45 is a pinion 46 the teeth of which mesh with rack teeth 47 on the lower edge of the adjacent end of the upper bar 32. A similar pinion is journaled in like position in the box 41 at the opposite side of the machine and the teeth of this pinion mesh with rack teeth on the upper edge of the adjacent end of the lower bar 33. The upper edge of the lower bar 33 is cut away, or is toothless, so that the pinion 46 when oscillated, will cause the reciprocation of the upper bar 32 but will not move or interfere with the movement of the lower bar 33. On the other hand, the corresponding pinion in the other box 41 is adapted by its oscillation to reciprocate the lower bar 33 but does not have toothed engagement with the upper bar and therefore does not interfere with the movement of the upper bar by the pinion 46. In this way the two bars have rolling bearings at their opposite ends and one bar 32 is reciprocated by the pinion and rack at one end of this bar while the other bar 33 is reciprocated by a similar rack and pinion located at its opposite end.

The pinion 46 is fixed to one end of a shaft 50 suitably journaled in the box 42, and fixed to the opposite end of this shaft is a pinion 51 the teeth of which mesh with a rack bar 52 arranged to reciprocate vertically in the box 42. This rack bar 52 preferably bears, opposite the pinion 51, against bearing rollers 53 suitably journaled in the box 42.

Thus, by the reciprocation of the rack bar 52, the pinion 46 is oscillated and causes the transverse horizontal reciprocation of the upper guide bar 32. The pinion in the box 41 at the opposite side of the machine is similarly oscillated by a rack bar 54 which may be similarly guided for vertical reciprocation in the box 41.

The rack bars 52 and 54 may be reciprocated by any suitable mechanism such, for instance, as pitmen 55 and 56 which connect the rack bars with crank pins 57 on crank wheels 58 and 59 secured to the opposite ends of a transverse shaft 60 which is journaled in suitable bearings at the top of the machine and may be driven by change speed gearing arranged within a housing 61, or by any other suitable drive mechanism. Preferably, the pins 57 are adjustable eccentrically on the wheels 58 and 59, for instance, in radial slots in the wheels so as to vary the throw of the crank pins and correspondingly vary the length of the reciprocating movements of the two guide bars 32 and 33. By this mechanism the guide bars 32 and 33 are simultaneously reciprocated oppositely transversely of the machine and the extent of the reciprocating movements can be adjusted to regulate, as desired, the width of the courses of the zig-zag threads to thereby cause these threads to extend a greater or less distance transversely of the sheet material so that each zig-zag thread of one series will cross or intersect a greater or less number of the zig-zag threads of the other series.

By connecting the guides on the reciprocating bars 32 and 33, by flexible tubes 38, with the companion stationary guides 29, a continuous flexible guide passage is provided for each thread from its stationary guide orifice 28 to its reciprocating delivery end or tube 35 or 36, and this greatly facilitates the threading of the guides of the machine. With this arrangement it is possible to place the end of a thread at the outer end of one of the stationary guide nipples 29 and then by means of a blast of compressed air, from a suitable hand or movable nozzle, to blow the thread through the nipple and the connected flexible tube 38 and guide tube 35 or 36. The threads can thus be very quickly and easily threaded through the various guides of the machine and this can even be done when the machine is in operation with the guide tubes 35 and 36 reciprocating back and forth. Therefore, in the event that one or more of the threads should break during the operation of the machine, it is not necessary to stop the machine in order to replace the broken threads, but it is only necessary to place threads at the outer ends of the appropriate guide nipples 29 and, by means of the air nozzle, blow the threads through flexible guides connecting with the reciprocating guide tube or tubes. Thus, the described mechanism, not only greatly facilitates and lessens the time required for threading up the machine before commencing production of the reenforced paper, but it obviates shutdowns or stoppages of the machine which would otherwise be necessary in order to insert threads to replace those which may become broken during the operation of the machine.

It will be noted that the zig-zag threads do not extend transversely across the full width of the web but only for a comparatively small fraction of the width of the web. For instance, the zig-zag course of the threads may extend transversely of the web for only a distance, say, from four to six inches whereas the web may be several feet in width. As a result of this arrangement of the zig-zag threads, the material can be produced at a very much greater speed since the webs can travel at a much higher speed through the machine than would be possible if the longitudinal travel of the webs had to be gauged to suit the travel of zig-zag thread guides which move transversely the full width of the web. In other words, the lineal travel of the material through the machine with the described arrangement of the zig zag threads can be several times that which is possible in a machine in which the zig-zag threads extend transversely for the full width of the web and, as a consequence, the possible output of the machine is several times that of a machine making material having the zig-zag threads extending the full width of the web. Nevertheless, since each zig-zag thread crosses several oppositely running zig-zag threads, and also several straight longitudinal threads, if straight threads are also employed, a strong paper or fabric is produced. The courses of the zigzag threads may be made proportionally much wider than shown in Fig. 8, but the speed of production will be decreased proportionately to the increased width of the courses.

The change speed drive gearing in the housing 61 may be of any suitable construction adapted to be set or adjusted to drive the reciprocating thread guides at different speeds. By changing the speed of the guides relatively to the rate of travel of the webs, the length or pitch of the undulations of the zig-zag can be increased or decreased as may be desired.

I claim:

1. The combination with means for producing lengthwise travel of a web of material, of means for applying reinforcing threads to said web including guides through which the threads pass to the web, and which have stationary entrance ends for the threads and delivery ends adjacent the web, and means for moving the delivery ends of said guides transversely of the web during its travel for laying the threads in courses extending angularly relatively to the direction of travel of the web.

2. In combination with means for producing lengthwise travel of a web of sheet material, of means for laying reenforcing threads on said web comprising guide tubes through which the threads pass to the web and which have stationary entrance ends for the threads and delivery ends adjacent the web, and means for moving the delivery ends of said guide tubes transversely of the web during its travel for laying the threads in courses extending angularly relatively to the direction of travel of the web.

3. The combination with means for producing lengthwise travel of a web of sheet material, of means for laying and securing reenforcing threads on said web comprising flexible guide tubes through which the threads pass and which have delivery ends adjacent the web, and means for reciprocating the delivery ends of said guide tubes transversely of the web during its travel for laying the threads in zig-zag courses.

4. The combination with means for producing lengthwise travel of a web of sheet material, of means for laying and securing reenforcing threads on said web comprising two groups of guide tubes through which the threads pass to the web and which have stationary entrance ends for the threads and delivery ends adjacent the web, and means for oppositely reciprocating the delivery ends of said two groups of guide tubes transversely of the web during its longitudinal travel for laying the threads in intersecting zig-zag courses.

5. The combination with means for producing lengthwise travel of a web of sheet material, of guide mechanism for reenforcing threads comprising tubular thread guides which reciprocate transversely of the web during its travel for laying the threads in zig-zag courses on said web, stationary tubular thread guides, and a flexible tube connecting each of said reciprocating guides to one of said stationary guides and forming a continuous guide passage for the thread.

6. The combination with means for producing lengthwise travel of two webs of sheet material, and means for cementing said webs together, of means for laying reenforcing threads between said webs comprising guide tubes having stationary ends for the entrance of the threads, and delivery ends adjacent the point where the webs are brought together for cementing, and means for moving the delivery ends of said guide tubes transversely of the web during its travel for laying the threads in courses extending angularly relatively to the direction of travel of said webs.

7. The combination with means for producing lengthwise travel of two webs of sheet material, and means for cementing said webs together, comprising presser rollers between which said webs pass, of means for laying reenforcing threads between said webs comprising guide tubes having stationary ends for the entrance of the threads, a bar extending parallel with and adjacent said presser rollers on which the delivery ends of said tubes are secured, and means for reciprocating said bar during the longitudinal travel of said webs.

8. The combination with means for producing lengthwise travel of two webs of sheet material, and means for cementing said webs together, comprising presser rollers between which said webs pass, of means for laying reenforcing threads between said webs comprising guide tubes having stationary ends for the entrance of the threads, and delivery ends disposed close to the bite of said rollers, and means for reciprocating the delivery ends of said guide tubes transversely of the web during its travel for laying the threads in zig-zag courses.

9. The combination with means for producing lengthwise travel of two webs of sheet material, and means for cementing said webs together comprising presser rollers between which said webs pass, of means for laying reenforcing threads between said webs comprising guide tubes having stationary ends for the entrance of the threads, and delivery ends disposed in two oppositely inclined groups close to the bite of said rollers, and means for oppositely reciprocating said two groups of delivery ends of the guide tubes transversely of the web during its travel for laying the threads in intersecting zig-zag courses.

GEORGE CHADWICK.